(12) United States Patent
Nagamiya et al.

(10) Patent No.: US 8,004,819 B2
(45) Date of Patent: Aug. 23, 2011

(54) CAPACITOR ARRAY AND METHOD FOR MANUFACTURING THE SAME

(75) Inventors: Katsumori Nagamiya, Izumo (JP); Atsushi Ishida, Echizen (JP); Akihiro Motoki, Fukui (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 392 days.

(21) Appl. No.: 12/249,032

(22) Filed: Oct. 10, 2008

(65) Prior Publication Data

US 2009/0103240 A1    Apr. 23, 2009

(30) Foreign Application Priority Data

Oct. 18, 2007    (JP) .................................. 2007-270915

(51) Int. Cl.
*H01G 4/005* (2006.01)
*H01G 4/06* (2006.01)
(52) U.S. Cl. ........................ 361/303; 361/311; 29/25.42
(58) Field of Classification Search .......... 361/303–305, 361/311, 306.1, 306.3, 306.2, 309; 29/25.42
See application file for complete search history.

(56) References Cited

U.S. PATENT DOCUMENTS

| | | | |
|---|---|---|---|
| 6,960,366 B2 | 11/2005 | Ritter et al. | |
| 6,972,942 B2 | 12/2005 | Ritter et al. | |
| 6,982,863 B2 | 1/2006 | Galvagni et al. | |
| 7,067,172 B2 | 6/2006 | Ritter et al. | |
| 7,152,291 B2 | 12/2006 | Ritter et al. | |
| 7,154,374 B2 | 12/2006 | Ritter et al. | |
| 7,161,794 B2 | 1/2007 | Galvagni et al. | |
| 7,177,137 B2 | 2/2007 | Ritter et al. | |
| 7,344,981 B2 | 3/2008 | Ritter et al. | |
| 7,345,868 B2 | 3/2008 | Trinh | |
| 2004/0027787 A1 | 2/2004 | Yamauchi et al. | |
| 2005/0046536 A1 | 3/2005 | Ritter et al. | |
| 2006/0245141 A1 | 11/2006 | Shirasu et al. | |
| 2007/0014075 A1 | 1/2007 | Ritter et al. | |
| 2007/0133147 A1 | 6/2007 | Ritter et al. | |
| 2008/0123248 A1 | 5/2008 | Kunishi et al. | |

(Continued)

FOREIGN PATENT DOCUMENTS

JP    03-178110 A    8/1991

(Continued)

OTHER PUBLICATIONS

Official Communication issued in corresponding Japanese Patent Application No. 2007-270915, mailed on Feb. 23, 2010.

(Continued)

*Primary Examiner* — Eric Thomas
(74) *Attorney, Agent, or Firm* — Keating & Bennett, LLP

(57) ABSTRACT

A capacitor array includes mutually opposed first and second internal electrodes having a first capacitance portion and a second capacitance portion, respectively, a first lead portion and a second lead portion, respectively, which are electrically connected to a first outer terminal electrode and a second outer terminal electrode, and a first protrusion portion and a second protrusion portion, respectively, which partially protrude toward the second outer terminal electrode and the first outer terminal electrode. The outer terminal electrodes have plating films directly connected to the internal electrodes. The plating film is formed by electrolytic plating. In the electrolytic plating, deposition of plating proceeds while being prevented from spreading in width directions of the individual side surfaces by electric fields generated from the protrusion portions toward the vicinities of exposure portions of the respective lead portions on the side surfaces.

5 Claims, 9 Drawing Sheets

U.S. PATENT DOCUMENTS

| | | |
|---|---|---|
| 2008/0123249 A1 | 5/2008 | Kunishi et al. |
| 2008/0145551 A1 | 6/2008 | Kunishi et al. |
| 2008/0151470 A1 | 6/2008 | Motoki et al. |
| 2008/0158774 A1 | 7/2008 | Trinh |
| 2008/0210564 A1 | 9/2008 | Motoki et al. |
| 2008/0225462 A1 | 9/2008 | Motoki et al. |
| 2008/0239617 A1 | 10/2008 | Motoki et al. |

FOREIGN PATENT DOCUMENTS

| | | | |
|---|---|---|---|
| JP | 06-069063 A | | 3/1994 |
| JP | 11-154621 A | | 6/1999 |
| JP | 2000-277380 A | | 10/2000 |
| JP | 2001-203122 A | | 7/2001 |
| JP | 2003-272945 A | | 9/2003 |
| JP | 2004047707 A | * | 2/2004 |
| JP | 2004-228514 A | | 8/2004 |
| JP | 2006-210590 A | | 8/2006 |
| JP | 2006-332601 A | | 12/2006 |
| WO | 2007/049456 A1 | | 5/2007 |
| WO | 2008/023496 A1 | | 2/2008 |

OTHER PUBLICATIONS

Nagamiya: "Monolithic Ceramic Electronic Component," U.S. Appl. No. 12/249,029, filed Oct. 10, 2008.

* cited by examiner

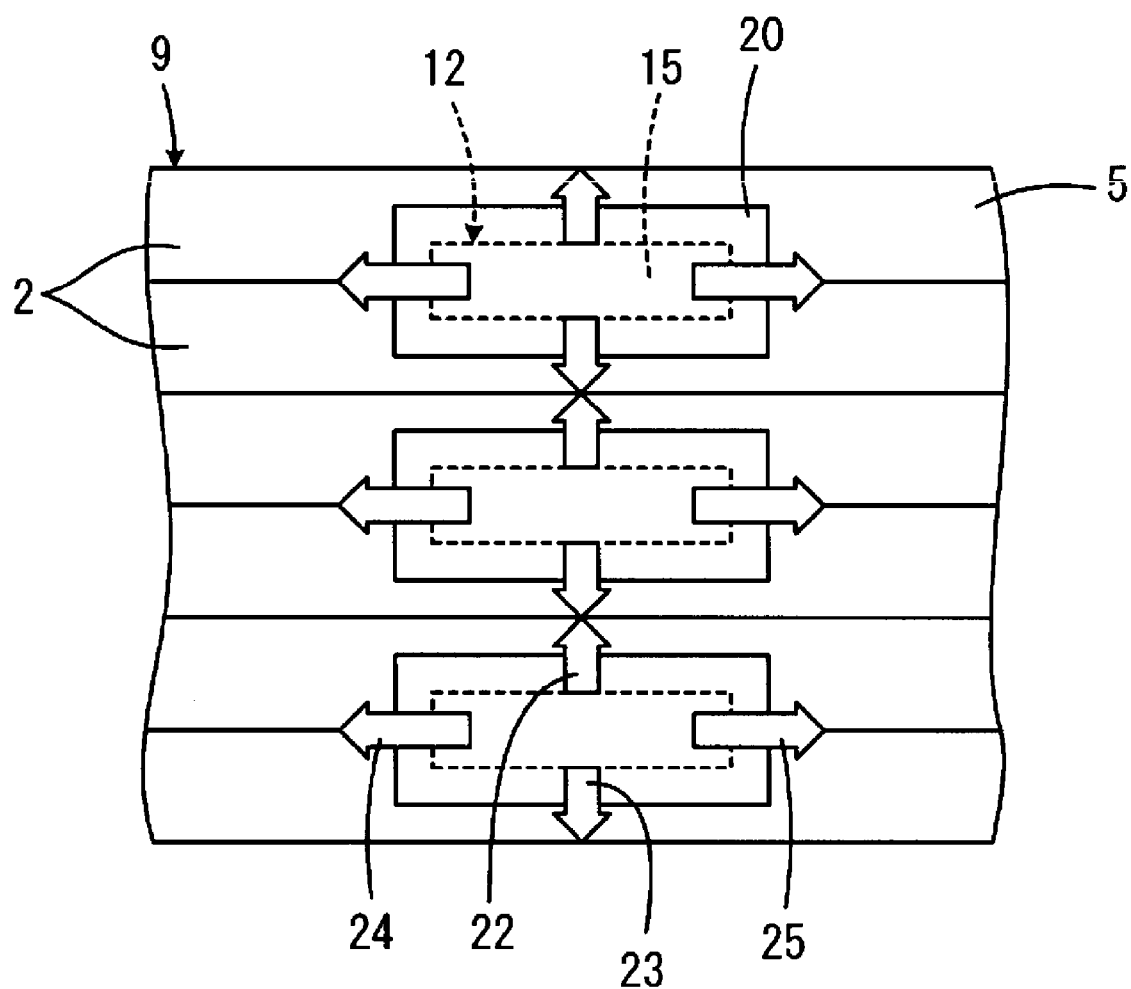

CAPACITOR ARRAY AND METHOD FOR MANUFACTURING THE SAME

BACKGROUND OF THE INVENTION

1. Field of the Invention

The present invention relates to a capacitor array and a method for manufacturing the same. In particular, the present invention relates to a capacitor array including an outer terminal electrode, at least a portion of which includes a plating film directly connected to an internal electrode, and a method for manufacturing the same.

2. Description of the Related Art

In recent years, along with miniaturization of portable electronic apparatuses, e.g., cellular phones and portable music players, high density mounting of electronic components on wiring substrates incorporated in the electronic apparatuses have been rapidly advanced. In response to this, an electronic component, in which a plurality of circuit elements are incorporated into one chip, is desired in order to reduce the mounting space and the number of components required to be mounted. For example, various array type electronic components, such as a capacitor array, for example, have been developed.

Multi-terminal type electronic components, such as array type electronic components, usually include substantially rectangular component main bodies, and a plurality of substantially band-shaped outer terminal electrodes that are disposed on individual side surfaces of the component main bodies. There are technical issues that, as described below, arise during the formation of the above-described substantially band-shaped outer terminal electrodes.

(1) The outer terminal electrodes are formed so as to cover the ends of the internal electrodes exposed at the side surfaces of the component main bodies in order to prevent reduced reliability.

(2) The outer terminal electrodes are formed so as to ensure that desired distances between adjacent outer terminal electrodes in order to prevent the occurrence of a solder bridge during mounting.

The substantially band-shaped outer terminal electrodes have been formed primarily by baking electrically conductive pastes. With this method, the precision of the application of the electrically conductive paste is limited. Therefore, the electrically conductive paste is typically applied so as to have a width slightly greater than the exposure width of the internal electrode such that a predetermined distance between the outer terminal electrodes is ensured. Consequently, the amount of miniaturization of a multi-terminal type electronic component has been limited when conventional methods, such as baking of the electrically conductive paste, have been used to form the substantially band-shaped outer terminal electrode.

A method capable of overcoming the above-described problems is disclosed in Japanese Unexamined Patent Application Publication No. 2004-327983, which discloses a method in which an outer terminal electrode is formed by direct plating instead of baking an electrically conductive paste. Japanese Unexamined Patent Application Publication No. 2004-327983 describes that it is possible to selectively deposit a metal on an end edge of an exposed internal electrode by applying direct plating, and, therefore, the outer terminal electrode having substantially the same width as the exposure width of the internal electrode can be formed with a high degree of precision.

Japanese Unexamined Patent Application Publication No. 2004-327983 describes that the outer terminal electrode is formed primarily by electroless plating. However, with the electroless plating, there are problems in that a plating film formation rate is relatively low and the density of the resulting plating film is relatively low. In order to improve the plating film formation rate and the density of the resulting plating film, a method has been used in which a catalyst substance, e.g., Pd, is formed prior to the formation of the plating film. When this method is used, problems occur in that the process is complicated and the cost is increased.

Furthermore, the electroless plating utilizes the principle that film formation is conducted by a chemical reaction in a plating solution. Therefore, a plating film is likely to be deposit at undesired locations, and a plating film may grow in a width direction, that is, toward adjacent outer terminal electrodes. In this case, the distance between outer terminal electrodes may be reduced to the extent that a solder bridge is produced during mounting.

Moreover, Japanese Unexamined Patent Application Publication No. 2004-327983 describes that in order to facilitate formation of a continuous plating film between exposed portions of a plurality of internal electrodes, dummy internal electrodes referred to as "anchor tabs" are formed between adjacent internal electrodes, and ends of the dummy internal electrodes are exposed between adjacent internal electrodes. Particularly, a first dummy internal electrode and a second dummy internal electrode are disposed on the same planes as those of mutually opposed first internal electrode and second internal electrode, respectively. The first dummy internal electrode and the second dummy internal electrode are electrically insulated from the first internal electrode and the second internal electrode, respectively. The first dummy internal electrode is exposed at a side surface at which the second internal electrode is exposed, and the second dummy internal electrode is exposed at a side surface at which the first internal electrode is exposed.

However, when such dummy internal electrodes are provided, the exposure area of the internal electrodes increases by the area of the dummy internal electrodes. Consequently, problems may occur in that a degree of sealing between the dielectric layers is reduced and the reliability of multi-terminal type electronic components deteriorates.

SUMMARY OF THE INVENTION

To overcome the problems described above, preferred embodiments of the present invention provide a capacitor array in which outer electrodes can be formed with good dimensional precision and a method for manufacturing the same.

According to preferred embodiments of the present invention, a capacitor array includes a capacitor main body which includes by a plurality of laminated dielectric layers and which has mutually opposed first and second principal surfaces, mutually opposed first and second side surfaces, and mutually opposed first and second end surfaces, a plurality of first outer terminal electrodes which are disposed on the first side surface and which are substantially in the shape of bands having widths less than the width of the first side surface, a plurality of second outer terminal electrodes which are disposed on the second side surface and which are substantially in the shape of bands having widths less than the width of the second side surface, and a plurality of first internal electrodes and a plurality of second internal electrodes disposed in the inside of the capacitor main body, wherein the plurality of first internal electrodes and the plurality of second internal electrodes are arranged alternately in a lamination direction and sets, each including the plurality of first internal electrodes and the plurality of second internal electrodes arranged alternately in the lamination direction, are distributed in width directions of the first and second side surfaces.

The first internal electrode includes a first capacitance portion opposed to the second internal electrode with a dielectric layer therebetween, a first lead portion which extends from the first capacitance portion towards the first side surface and which is electrically connected to the first outer terminal electrode, and a first protrusion portion partially protruding from the first capacitance portion toward the second outer terminal electrode on the second side surface while not extending to the second side surface.

The second internal electrode includes a second capacitance portion opposed to the first internal electrode with a dielectric layer therebetween, a second lead portion which extends from the second capacitance portion toward the second side surface and which is electrically connected to the second outer terminal electrode, and a second protrusion portion partially protruding from the second capacitance portion toward the first outer terminal electrode on the first side surface while not extending to the first side surface.

Furthermore, the first outer terminal electrode includes a first plating film directly connected to the first internal electrode, and the second outer terminal electrode includes a second plating film directly connected to the second internal electrode.

In the capacitor array according to preferred embodiments of the present invention, preferably, the width of the end of the first protrusion portion is less than the width of the first lead portion and the width of the end of the second protrusion portion is less than the width of the second lead portion.

Preferably, each of the first protrusion portion and the second protrusion portion has a substantially tapered shape in which the width of the end is less than the width of the base.

In the capacitor array according to preferred embodiments of the present invention, the plurality of first internal electrodes may be disposed in the same plane, and the plurality of second internal electrodes may be disposed in the same plane that is different from the plane in which the first internal electrodes are disposed. Alternatively, the first internal electrodes and the second internal electrodes may be disposed alternately in the same plane.

According to preferred embodiments of the present invention, a method for manufacturing a capacitor array is provided, the method including the steps of preparing a capacitor main body which includes a plurality of laminated dielectric layers and has mutually opposed first and second principal surfaces, mutually opposed first and second side surfaces, and mutually opposed first and second end surfaces, and in the inside of which a plurality of first internal electrodes and a plurality of second internal electrodes are disposed, the plurality of first internal electrodes and the plurality of second internal electrodes are arranged alternately in a lamination direction, and sets, each including the plurality of first internal electrodes and the plurality of second internal electrodes arranged alternately in the lamination direction, are distributed in width directions of the first and second side surfaces, forming a plurality of first outer terminal electrodes, which are substantially in the shape of bands having widths less than the width of the first side surface, on the first side surface, and forming a plurality of second outer terminal electrodes, which are substantially in the shape of bands having widths less than the width of the second side surface, on the second side surface.

The first internal electrode includes a first capacitance portion opposed to the second internal electrode with a dielectric layer therebetween, a first lead portion which extends from the first capacitance portion towards the first side surface and which is electrically connected to the first outer terminal electrode, and a first protrusion portion partially protruding from the first capacitance portion toward the second outer terminal electrode on the second side surface while not extending to the second side surface.

The second internal electrode includes a second capacitance portion opposed to the first internal electrode with a dielectric layer therebetween, a second lead portion which extends from the second capacitance portion toward the second side surface and which is electrically connected to the second outer terminal electrode, and a second protrusion portion partially protruding from the second capacitance portion toward the first outer terminal electrode on the first side surface while not extending to the first side surface.

The step of forming the first and second outer terminal electrodes includes electrolytic plating to directly form a plating film on portions of the first and second side surfaces at which end portions of the first and the second lead portions are individually exposed. In the electrolytic plating, deposition of plating proceeds while being prevented from spreading in individual width directions of the second and first side surfaces by electric fields generated individually from the first and second protrusion portions towards the vicinities of exposure portions of the second lead portion and the first lead portion, respectively, on the second and first side surfaces.

According to preferred embodiments of the present invention, when the electrolytic plating is conducted to form the first and second outer terminal electrodes, a plating deposit is initially generated at individual exposure portions of the first and second lead portions of the first and second internal electrodes on side surfaces of a ceramic laminate while individual exposed ends of the lead portions function as cores, and the plating gradually grows so as to spread along individual first and second side surfaces. Then, on the first side surface, plating films deposited on individual exposed portions of adjacent first lead portions are connected to each other, and, thereby, a substantially band-shaped first outer terminal electrode is formed. On the other hand, on the second side surface, plating films deposited on individual exposed portions of adjacent second lead portions are connected to each other, and, thereby, a substantially band-shaped second outer terminal electrode is formed.

At this time, the plating films tend to grow in individual width directions of the first and second side surfaces, that is, along the directions in which the principal surface extends. However, since the first and second protrusion portions are disposed in the first and the second internal electrodes, the deposition of the plating proceeds while being prevented from spreading in individual width directions of the second and first side surfaces by electric fields individually generated from the first and second protrusion portions towards the vicinities of exposure portions of the second lead portion and the first lead portion, respectively, on the second and first side surfaces. As a result, extension of the widths of the resulting outer terminal electrodes is advantageously suppressed and the distances between the outer terminal electrodes are maintained. Therefore, solder bridges are very unlikely to occur.

According to preferred embodiments of the present invention, the outer terminal electrodes are preferably formed by electrolytic plating. Therefore, the problems of, for example, a low plating growth rate and a low density of the plating film are prevented from occurring, whereas these problems are likely to occur when the outer terminal electrodes are formed by electroless plating.

Furthermore, the protrusion portion of the preferred embodiments of the present invention is not exposed at the side surface of the ceramic laminate, in contrast to the dummy internal electrode described in Japanese Unexamined Patent Application Publication No. 2004-327983, which is exposed. Consequently, an amount of sealing between the dielectric layers is not reduced and, therefore, the reliability of the capacitor array is not deteriorated.

The advantages produced by the protrusion portion are more significant when the widths of individual ends of the first and second protrusion portions are less than the widths of the first and second lead portions, respectively. This is because the concentration of electric fields on the protrusion portions is facilitated and an effect of attracting a plating metal on the opposed side surfaces is enhanced.

Furthermore, when each of the first protrusion portion and the second protrusion portion has a substantially tapered shape in which the width of the end is less than the width of the base, the concentration of electric fields on the ends of the protrusion portions is facilitated and an effect of attracting a plating metal on the opposed side surfaces is further enhanced.

Moreover, when the first internal electrodes and the second internal electrodes are arranged alternately in the same plane, any one of the first lead portions and the second lead portions are not arranged on only the first or the second side surface in a specific plane and junction portions of adjacent dielectric layers are well-balanced, so that the reliability of a monolithic ceramic electronic components is improved.

Other features, elements, characteristics and advantages of the present invention will become more apparent from the following detailed description of preferred embodiments of the present invention with reference to the attached drawings.

BRIEF DESCRIPTION OF THE DRAWINGS

FIG. 4 is a magnified partial plan view showing a first side surface of a capacitor main body as shown in FIG. 1 for explaining a growth state of a first plating film.

DETAILED DESCRIPTION OF PREFERRED EMBODIMENTS

Figure 1:
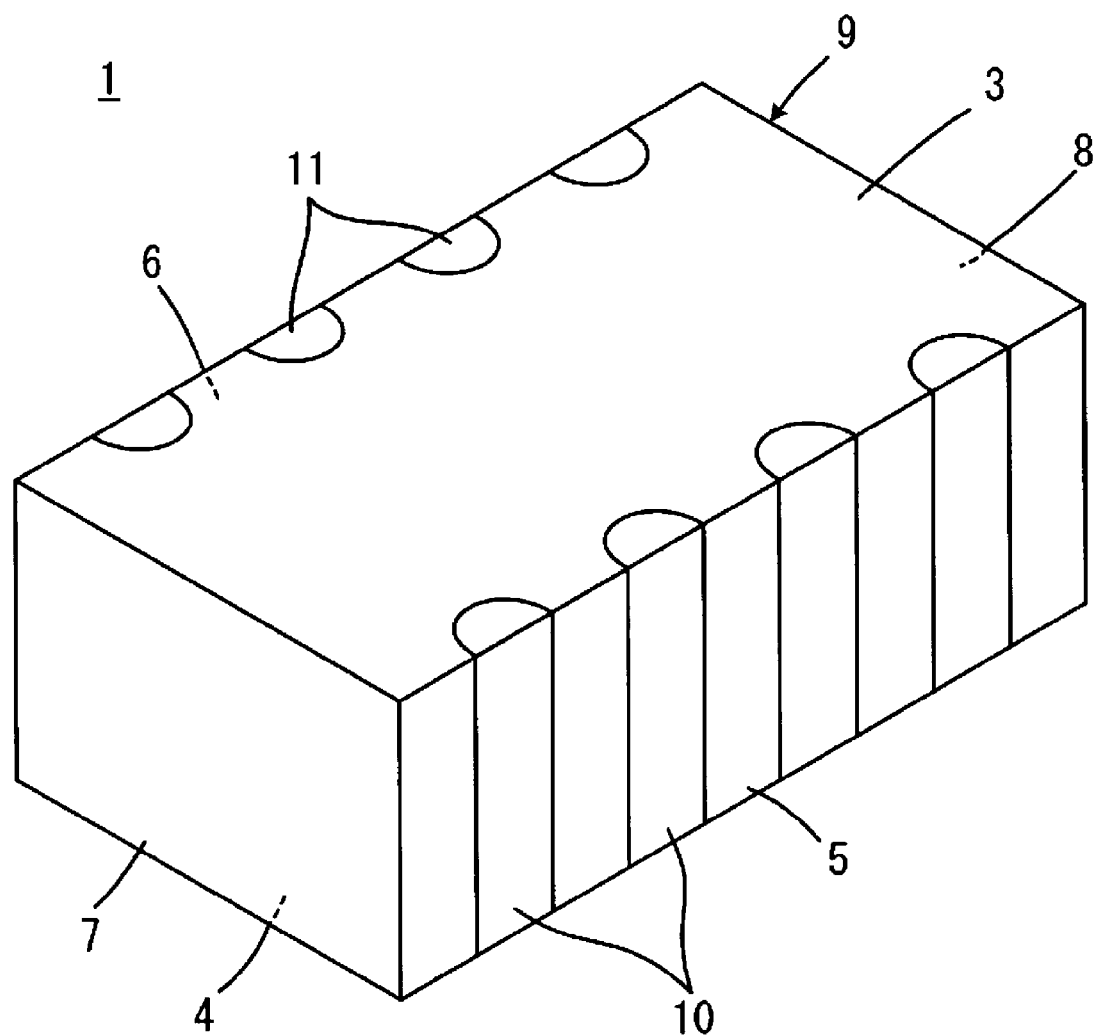
FIG. 1 is a perspective view showing an appearance of a capacitor array according to a first preferred embodiment of the present invention.
Figure 2:
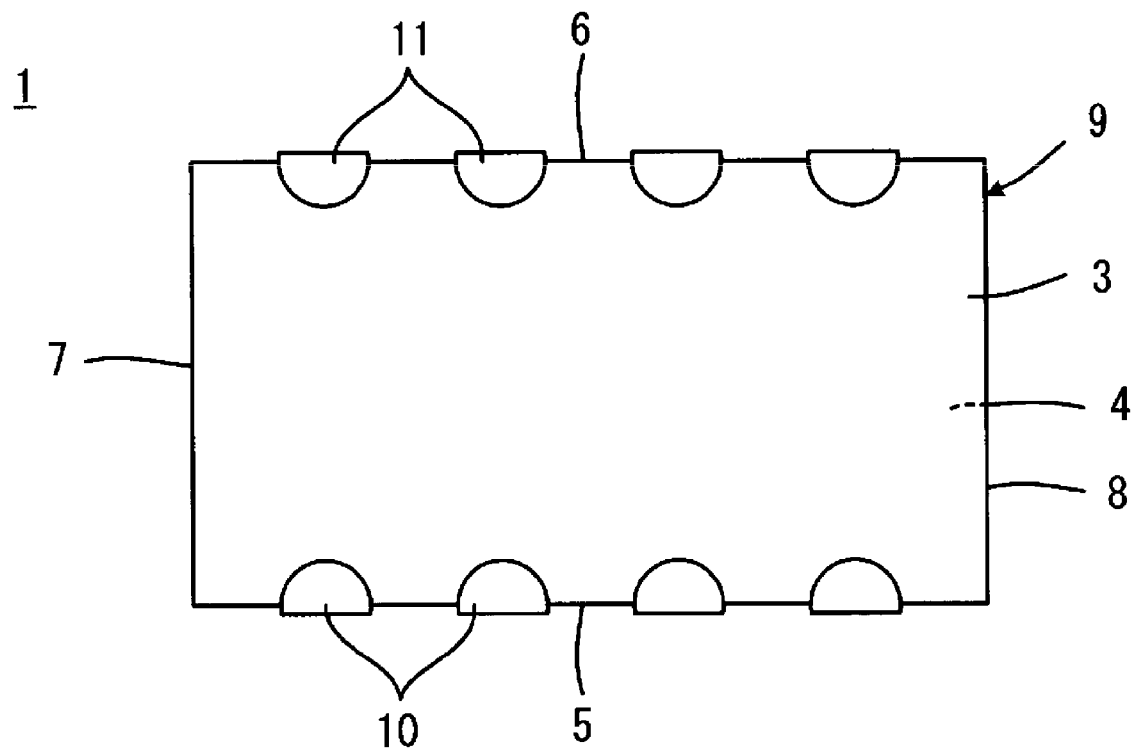
FIG. 2 is a plan view showing the appearance of the capacitor array as shown in FIG. 1.

FIGS. 1 to 6 are diagrams of a capacitor array 1 according to a first preferred embodiment of the present invention. FIG. 1 is a perspective view showing the capacitor array 1, and FIG. 2 is a plan view showing the capacitor array 1. FIGS. 3A and 3B are plan views showing the internal structure of the capacitor array 1, and FIGS. 3A and 3B show cross sections that are different from each other.

The capacitor array 1 includes a substantially rectangular capacitor main body 9 including a plurality of laminated dielectric layers 2 and having mutually opposed first and second principal surfaces 3 and 4, mutually opposed first and second side surfaces 5 and 6, and mutually opposed first and second end surfaces 7 and 8.

The dielectric layer 2 is preferably made of, for example, a dielectric ceramic including $BaTiO_3$, $CaTiO_3$, $SrTiO_3$, $CaZrO_3$, or other suitable ceramic as a primary component. Secondary components, e.g., Mn compounds, Fe compounds, Cr compounds, Co compounds, Ni compounds, or other suitable components may preferably be added to the above-described primary component. Preferably, the thickness of the dielectric layer 2 is about 1 μm to about 10 μm, for example.

A plurality of, for example, four first outer terminal electrodes 10 are arranged side by side on the first side surface 5 of the capacitor main body 9. A plurality of, for example, four second outer terminal electrodes 11 are arranged side by side on the second side surface 6.

Figure 3A:
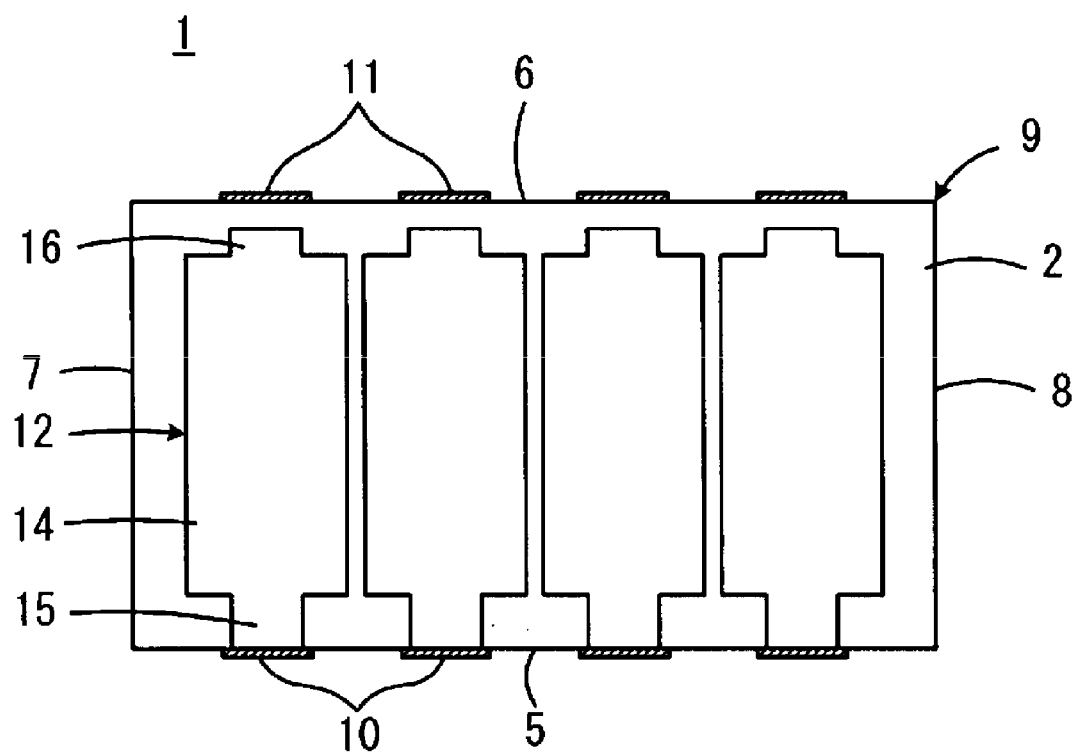
FIGS. 3A and 3B are plan views showing the internal structure of the capacitor array as shown in FIG. 1.
Figure 3B:
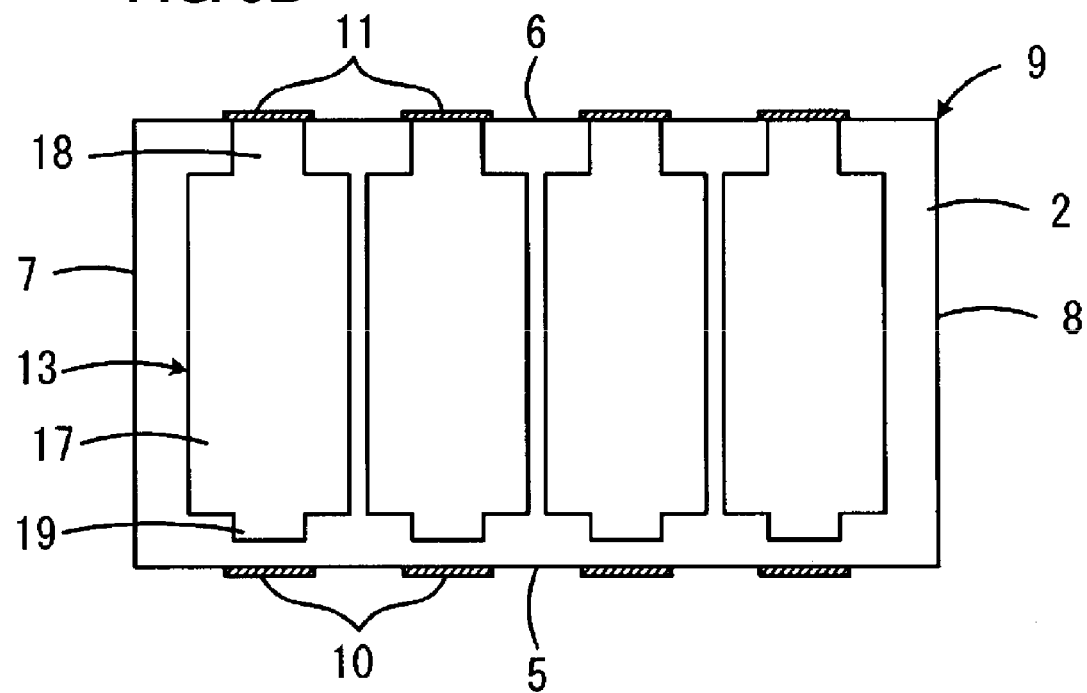

As shown in FIGS. 3A and 3B, inside of the capacitor main body 9, a plurality of first internal electrodes 12 and a plurality of second internal electrodes 13 are provided. Although not shown in FIGS. 3A and 3B, the plurality of first internal electrodes 12 and the plurality of second internal electrodes 13 are alternately arranged in a lamination direction. Furthermore, as shown in FIGS. 3A and 3B, sets, each including the plurality of first internal electrodes 12 and the plurality of second internal electrodes 13 arranged alternately in the lamination direction, are distributed in width directions of the side surfaces 5 and 6.

In the present preferred embodiment, as shown in FIG. 3A, the four first internal electrodes 12 are disposed in the same plane, and as shown in FIG. 3B, the four second internal electrodes 13 are disposed in the same plane that is different from the plane in which the first internal electrodes 12 are disposed.

The first internal electrode 12 includes a first capacitance portion 14 opposed to the second internal electrode 13 with a dielectric layer 2 therebetween, a first lead portion 15 which has a width less than the width of the first capacitance portion 14, which extends from the first capacitance portion 14 toward the first side surface 5, and which is electrically connected to the first outer terminal electrode 10, and a first protrusion portion 16 partially protruding from the first capacitance portion 14 toward the second outer terminal electrode 11 on the second side surface 6 while not extending to the second side surface 6.

The second internal electrode 13 includes a second capacitance portion 17 opposed to the first internal electrode 12 with a dielectric layer 2 therebetween, a second lead portion 18 which has a width less than the width of the second capacitance portion 17, which extends from the second capacitance portion 17 toward the second side surface 6, and which is electrically connected to the second outer terminal electrode 11, and a second protrusion portion 19 partially protruding from the second capacitance portion 17 toward the first outer terminal electrode 10 on the first side surface 5 while not extending to the first side surface 5.

An electrically conductive component included in the internal electrodes 12 and 13 can be, for example, Ni, Cu, Ag, Pd, Ag—Pd alloys, Au, and other suitable material. Preferably, the thickness of each of the internal electrodes 12 and 13 is about 0.5 μm to about 2.0 μm, for example.

The first outer terminal electrode 10 includes a first plating film directly connected to the first internal electrode 12, and the second outer terminal electrode 11 includes a second plating film directly connected to the second internal electrode 13. The first plating film is provided directly on the first side surface 5 of the capacitor main body 9, and the second plating film is provided directly on the second side surface 6.

Preferably, as shown in FIGS. 1 and 2, the first and the second plating films for the first and the second outer terminal electrodes 10 and 11 are formed so as to extend from the first and the second side surfaces 5 and 6, respectively, to a portion of each of the first and the second principal surfaces 3 and 4. In order to satisfactorily grow the first and second plating films so as to extend to a portion of each of the first and the second principal surfaces 3 and 4, substrate conductor films (not shown in the drawing) are interposed between the first plating film and each of the principal surfaces 3 and 4 and between the second plating film and each of the principal surfaces 3 and 4. The substrate conductor film is preferably formed by baking an electrically conductive paste including, for example, Cu, Ni, Ag, Pd, Ag—Pd alloys, or Au as an electrically conductive component. The first and second outer terminal electrodes 10 and 11 may be arranged only on the first and the second side surfaces 5 and 6, respectively.

Preferably, the plating films for the outer terminal electrodes 10 and 11 include a plurality of layers. In this case, the outermost plating layer must have good wettability with solder and, therefore, it is preferable that, for example, Sn or Au is included as a primary component. The plating film defining a substrate layer must have good solderability and, therefore, it is preferable that, for example, Cu, Ni, Ag, or Pd is included as a primary component. Furthermore, when a combination of metal species is likely to cause solder leaching, for example, when a plating layer defining a substrate layer includes Cu as a primary component and an outermost plating layer includes Sn as a primary component, it is preferable that a plating film primarily including Ni or other suitable material having solder leaching resistance is interposed as an intermediate layer. Preferably, the thickness of the plating layer is about 10 μm, for example. For a capacitor array incorporated in a component-containing substrate, the plating film may preferably be defined by a single-layer plating film primarily including Cu, for example.

A step of forming first and second plating films 20 and 21 defining the outer terminal electrodes 10 and 11 will be described below with reference to FIGS. 4 to 6.

FIG. 4 shows a portion of the first side surface 5 of the capacitor main body 9. In FIG. 4, the first plating film 20 is shown during a course of growth. The first plating film 20 will be described below. The second plating film 21 is formed in substantially the same manner.

The first plating film 20 is formed by electrolytic plating. In an electrolytic plating step, the first plating film 20 is initially deposited on an exposed end portion of the first lead portion 15 on the first side surface 5 while the exposed end of the first lead portion 15 of the first internal electrode 12 functions as a core. The first plating film 20 grows gradually so as to spread along the first side surface 5, as indicated by arrows 22 to 25. Then, the first plating films 20 deposited on exposed end portions of adjacent first lead portions 15 are joined to each other and, thereby, the first plating film 20 has a substantially band shape.

Here, the first plating film 20 not only grows in the lamination direction, as indicated by the arrows 22 and 23, but also grows in the width direction of the first side surface 5, as indicated by arrows 24 and 25. Consequently, the width of the first outer terminal electrode 10 increases and, as a result, a problem occurs in that the distance between the first outer terminal electrodes 10 is reduced. Protrusion portions 16 and 19 of the internal electrodes 12 and 13 function to prevent this problem. This will be described with reference to FIG. 5.

Figure 5:
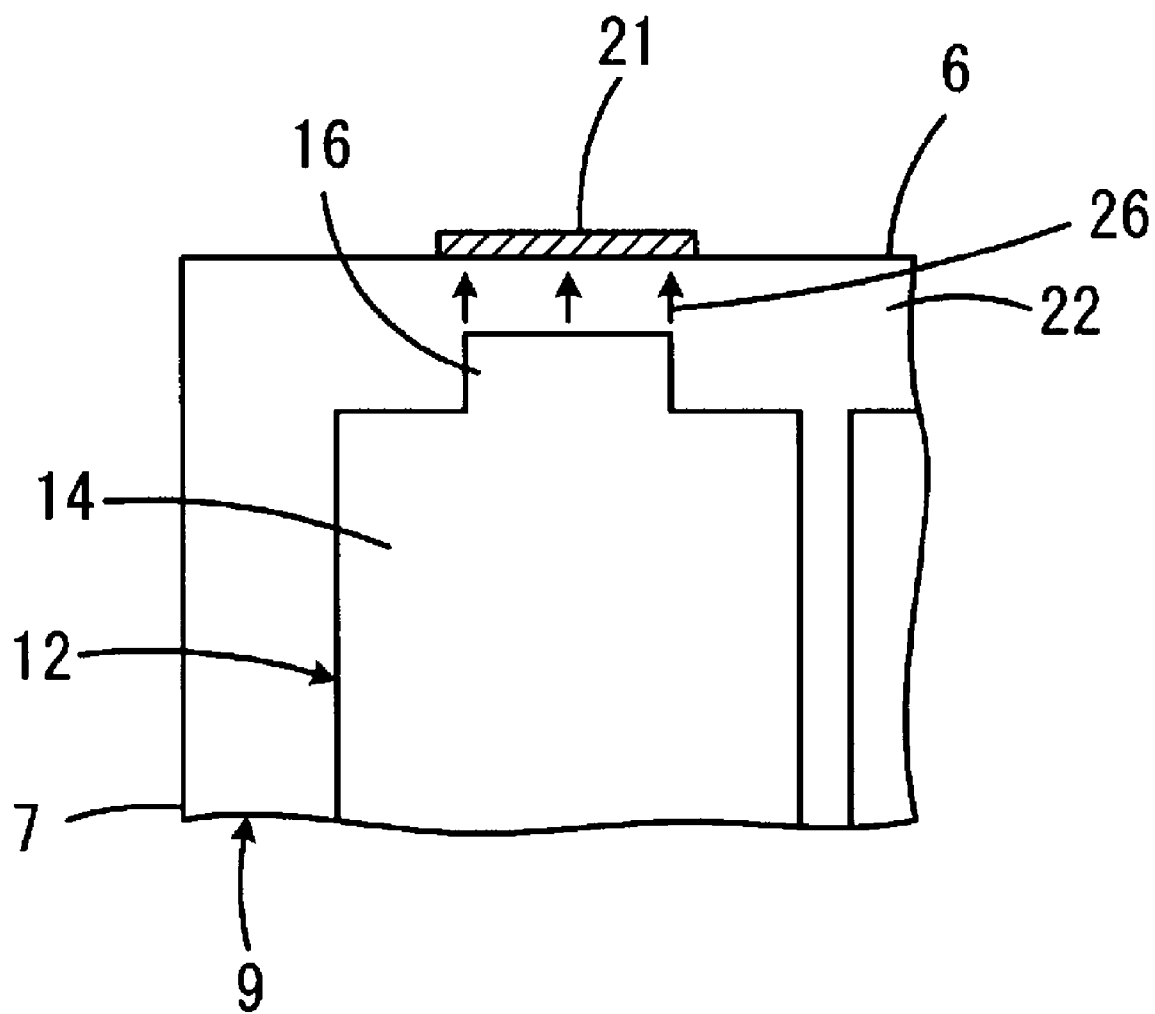
FIG. 5 is a magnified partial plan view of the capacitor main body as shown in FIG. 3A for explaining an operation of a first protrusion portion.

FIG. 5 is a partial plan view of the capacitor main body 9 as shown in FIG. 3A. In FIG. 5, the second side surface 6 of the capacitor main body 9, a second plating film 21 formed thereon, and a first protrusion portion 16 of the first internal electrode 12 are shown. The second plating film 21 and the first protrusion portion 16 will be described below.

In the electrolytic plating step for forming the second plating film 21, an electric field indicated by arrows 26 is generated from the first protrusion portion 16 toward the vicinity of the exposure portion of the second lead portion 18 (see FIG. 3B) on the second side surface 6. This electric field suppresses the growth of the second plating film 21 in the width direction of the second side surface 6 (corresponding to the arrows 24 and 25 as shown in FIG. 4) and facilitates the growth in the lamination direction (corresponding to the arrows 22 and 23 as shown in FIG. 4). Consequently, spreading of the second outer terminal electrode 11 in the width direction is suppressed, the distance between the second outer terminal electrodes 11 can be maintained and, as a result, solder bridges are not likely to occur.

Figure 6:
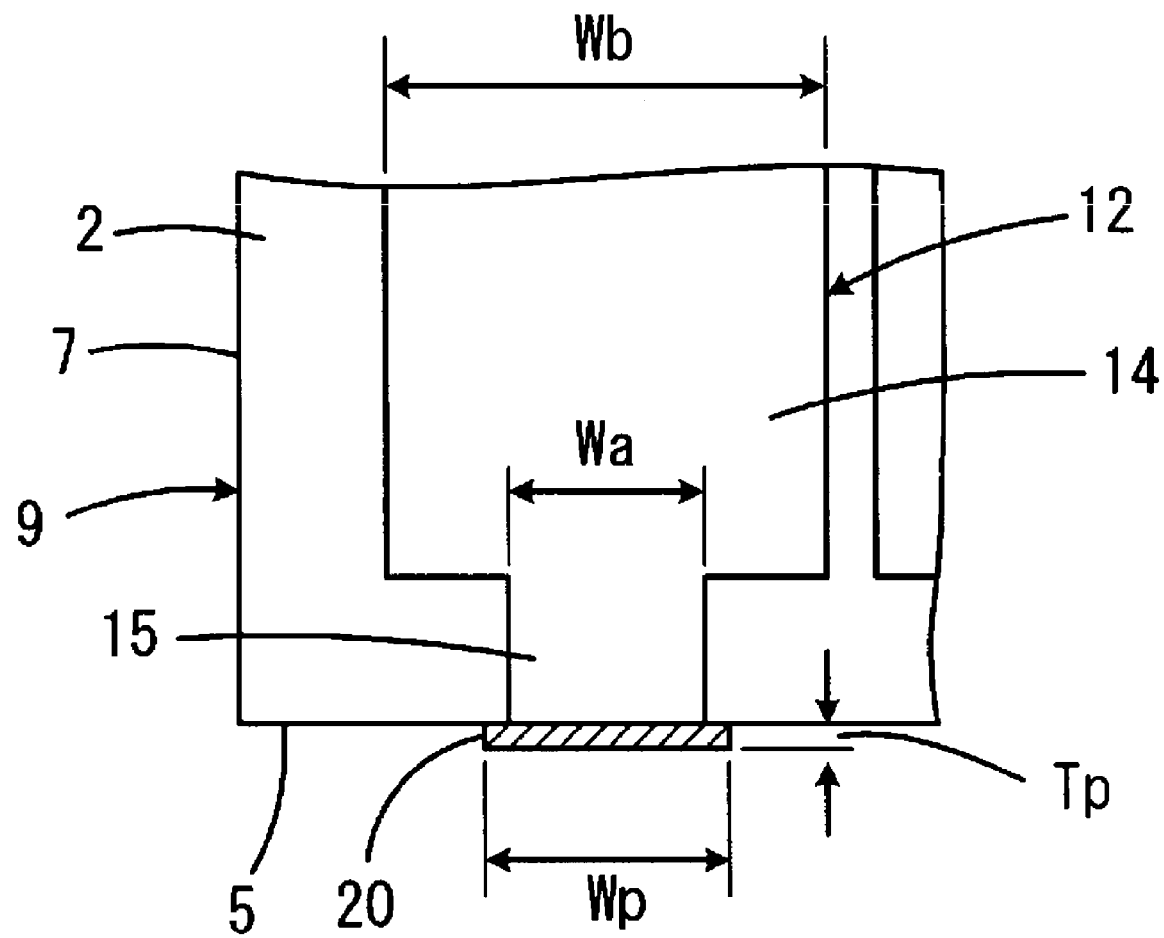
FIG. 6 is a magnified partial plan view of the capacitor main body as shown in FIG. 3B for explaining the dimensional relationship between a first lead portion and a first plating film.

FIG. 6 is a partial plan view of the capacitor main body 9 as shown in FIG. 3B. In FIG. 6, the first side surface 5 of the capacitor main body 9, a first plating film 20 formed thereon, and a first lead portion 15 provided to the first internal electrode 12 are shown.

As shown in FIG. 6, the width Wp of the first plating film 20 is greater than the width Wa of the first lead portion 15. This is because the first plating film 20 has grown in the width direction of the first side surface 5. In order to increase the capacitance, it is preferable that the width Wb of the first capacitance portion 14 is greater than the width Wp of the first plating film 20. Furthermore, in view of the spreading of the first plating film 20 in the width direction by substantially the thickness Tp thereof, it is preferable to adjust the design and plating conditions of the first internal electrode 12 such that the condition, $Wa+2Tp \leq Wb$, is satisfied, where Wp is assumed to be substantially equal to $Wa+2Tp$.

The first plating film 20 and the first internal electrode 12 have been described with reference to FIG. 6. The second plating film 21 and the second internal electrode 13 are substantially the same as the first plating film 20 and the first internal electrode 12.

An example of a method for manufacturing the above-described capacitor array 1 will be described below.

Each of ceramic green sheets defining dielectric layers 2, an electrically conductive paste for the internal electrodes 12 and 13, and an electrically conductive paste for substrate conductor films of portions of the outer terminal electrodes 10 and 11 to be formed on the principal surfaces 3 and 4 is prepared. Binders and solvents are included in the ceramic green sheets and individual electrically conductive pastes. Preferably, known organic binders and organic solvents can be used, for example.

The electrically conductive pastes are printed with predetermined patterns on the ceramic green sheets by, for example, a screen printing method. In this manner, the ceramic green sheets provided with electrically conductive paste films defining the internal electrodes 12 and 13 are prepared. Furthermore, the ceramic green sheets provided with electrically conductive paste films for substrate conductor films of the outer terminal electrodes 10 and 11 to be formed on the principal surfaces 3 and 4 are prepared.

The ceramic green sheets provided with electrically conductive paste films for the internal electrodes 12 and 13, as described above, are laminated in a predetermined order. A predetermined number of ceramic green sheets for outer layers provided with no electrically conductive paste film are laminated on the top and the bottom thereof. Furthermore, the ceramic green sheets provided with electrically conductive paste films for substrate conductor films of the outer terminal electrodes 10 and 11 to be formed on the principal surfaces 3 and 4 are laminated on the top and the bottom thereof. Consequently, a mother laminate in a green state is produced. If required, the green mother laminate is press-bonded in the lamination direction by, for example, hydrostatic press.

The green mother laminate is cut into a predetermined size and, thereby, a capacitor main body 9 in a green state is cut.

The green capacitor main body 9 is fired. Preferably, the firing temperature is in the range of, for example, about 900° C. to about 1,300° C., depending on the ceramic materials included in the ceramic green sheets and the metal materials included in the electrically conductive pastes. Firing atmospheres of air, $N_2$, steam+$N_2$, and other suitable atmospheres are used according to the types of metals and other materials included in the electrically conductive pastes.

The first and second plating films 20 and 21 are deposited on the respective regions, in which exposed end of the first and second internal electrodes 12 and 13 are arranged, on the first and the second side surfaces 5 and 6 of the sintered capacitor main body 9 and on the respective substrate conductor films on the principal surfaces 3 and 4 by electrolytic barrel plating. If required, upper plating films are formed on the first and the second plating films 20 and 21.

In this manner, the capacitor array 1 provided with the first and second outer terminal electrodes 10 and 11 including the first and second plating films 20 and 21, respectively, is produced.

Figure 7A:
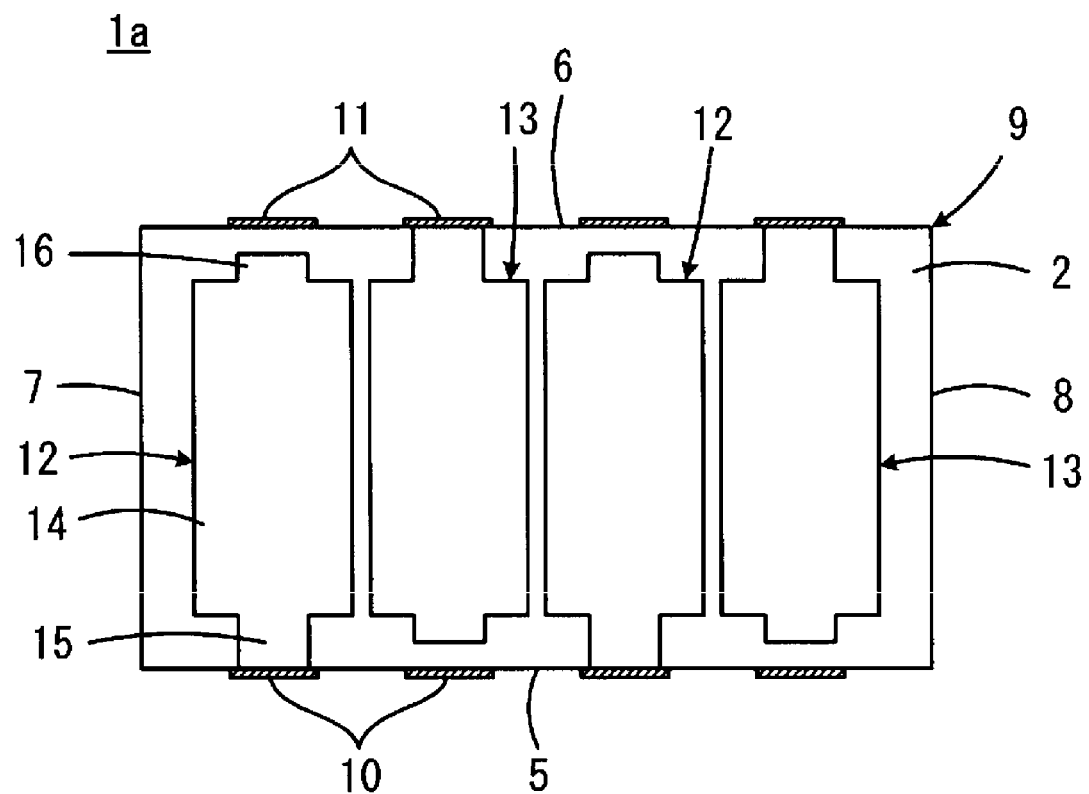
FIGS. 7A and 7B are diagrams corresponding to FIGS. 3A and 3B for explaining a capacitor array according to a second preferred embodiment of the present invention.
Figure 7B:
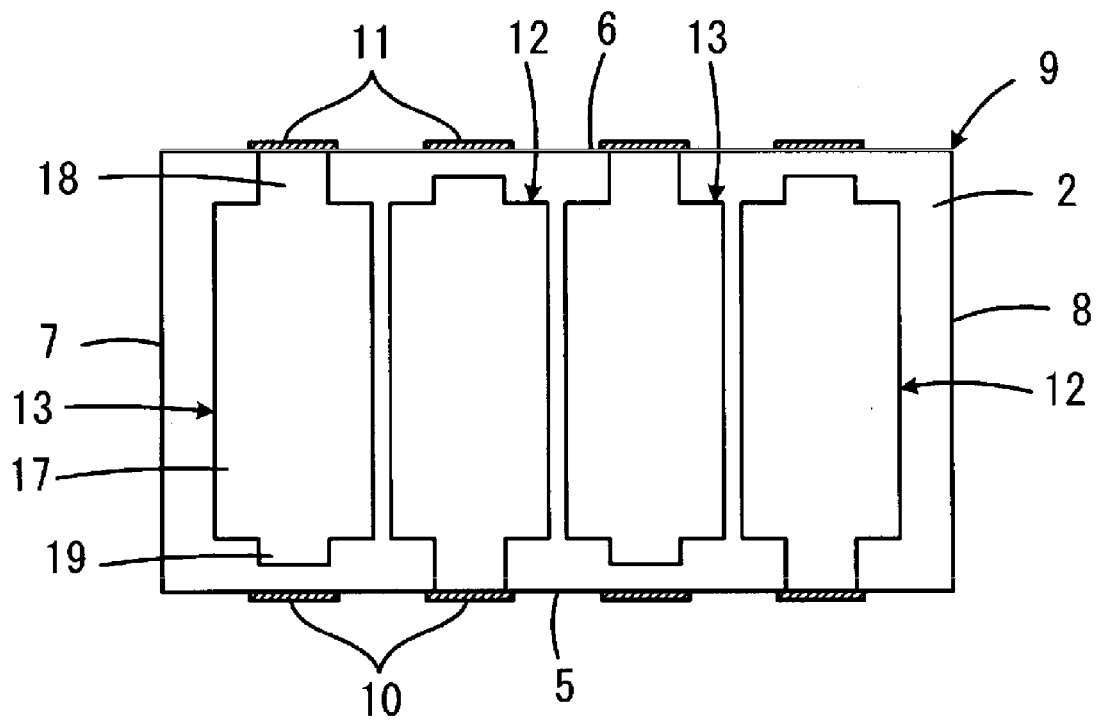

FIGS. 7A and 7B are diagrams corresponding to FIGS. 3A and 3B to explain a capacitor array 1*a* according to a second preferred embodiment of the present invention. In FIGS. 7A and 7B, the elements corresponding to the elements shown in FIGS. 3A and 3B are indicated by the same reference numerals as those set forth above and explanations thereof are not repeated.

The capacitor array 1*a* shown in FIGS. 7A and 7B includes the internal electrodes 12 and the internal electrodes 13 are arranged alternately in the same plane, as shown in each of FIGS. 7A and 7B. With this configuration, the first lead portions 15 and the second lead portions 18 are each arranged on both of the first side surface 5 and the second side surface 6 in a specific plane and junction portions of adjacent dielectric layers 2 are well-balanced, such that the reliability of the capacitor array 1 is improved.

Figure 8A:
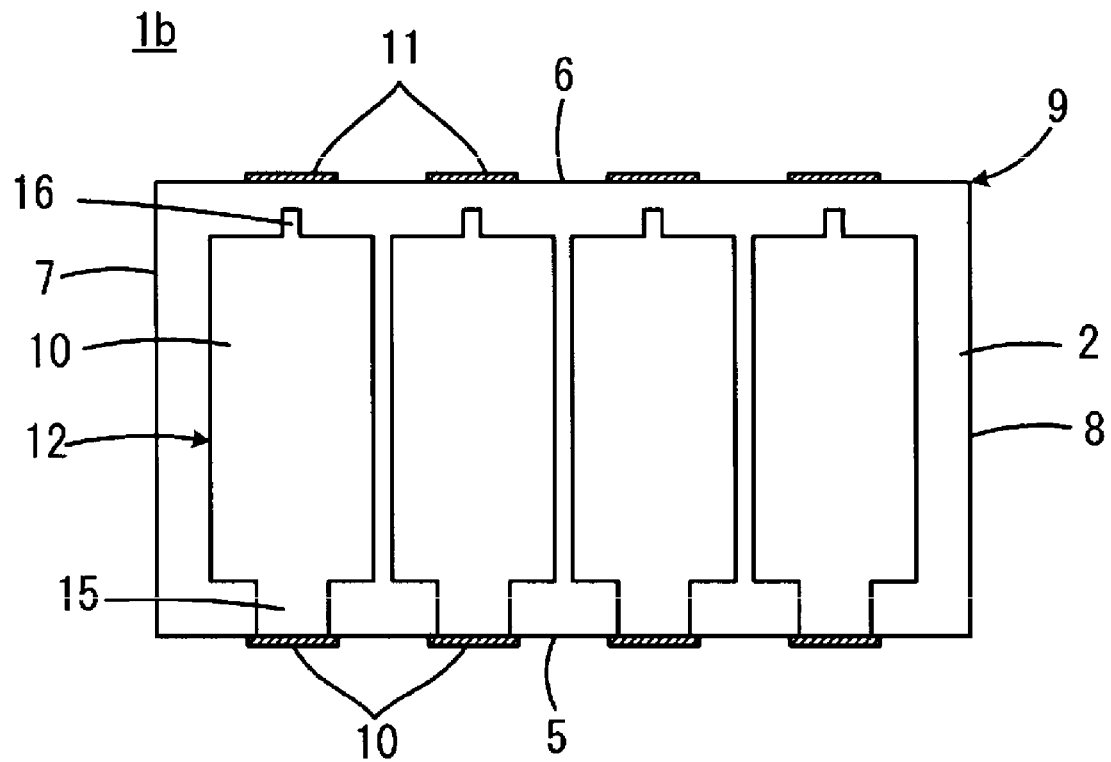
FIGS. 8A and 8B are diagrams corresponding to FIGS. 3A and 3B for explaining a capacitor array according to a third preferred embodiment of the present invention.
Figure 8B:
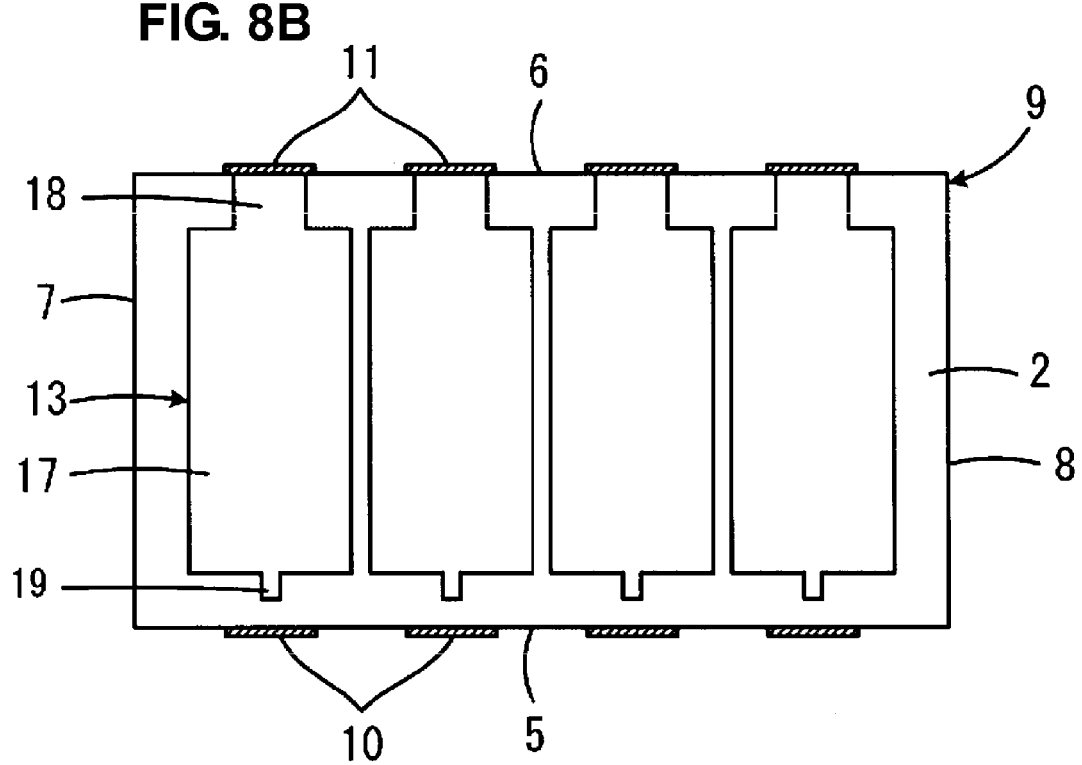

FIGS. 8A and 8B are diagrams corresponding to FIGS. 3A and 3B to explain a capacitor array 1*b* according to a third preferred embodiment of the present invention. In FIGS. 8A and 8B, the elements corresponding to the elements shown in FIGS. 3A and 3B are indicated by the same reference numerals as those set forth above and explanations thereof are not repeated.

In the capacitor array 1*b* shown in FIGS. 8A and 8B, the widths of the first and second protrusion portions 16 and 19, in particular the widths of the ends of the first and second protrusion portions 16 and 19 are less than the widths of the first and the second lead portions 15 and 18, respectively. With this configuration, in the electrolytic plating, concentration of electric fields on the protrusion portions 16 and 19 is improved and the attracting affect of a plating metal on the side surfaces 6 and 5 opposed to the protrusion portions 16 and 19, respectively, is improved.

The above-described features related to the widths of the first and the second protrusion portions 16 and 19 can also be used in the capacitor array 1*a* shown in FIGS. 7A and 7B.

Figure 9A:
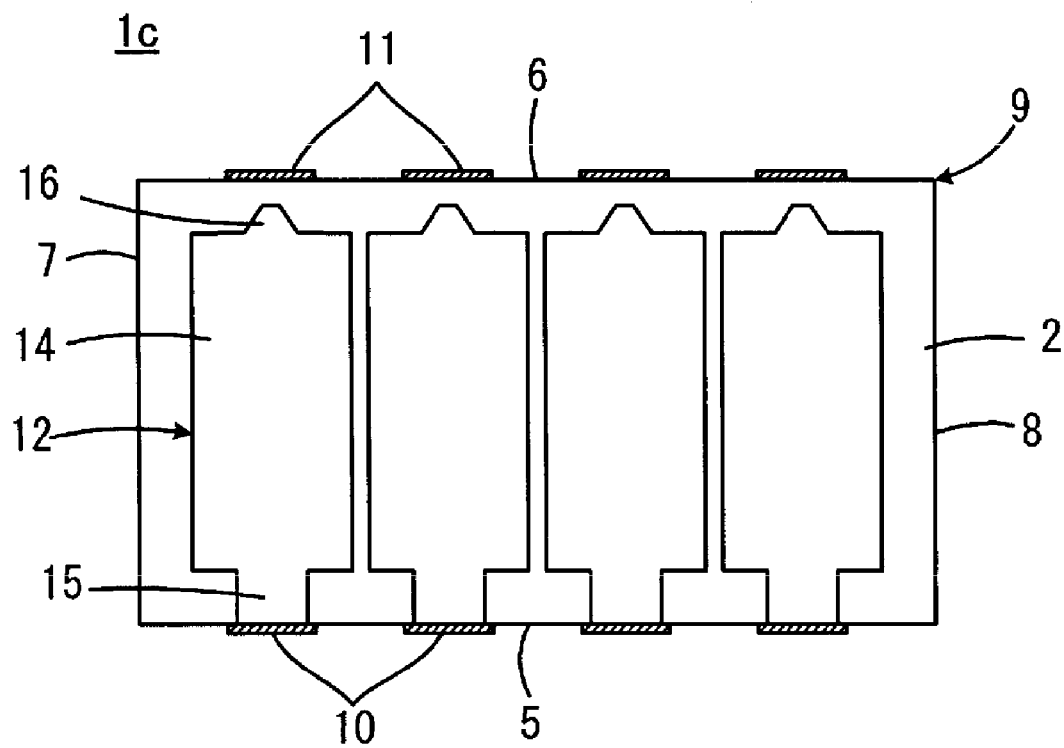
FIGS. 9A and 9B are diagrams corresponding to FIGS. 3A and 3B for explaining a capacitor array according to a fourth preferred embodiment of the present invention.
Figure 9B:
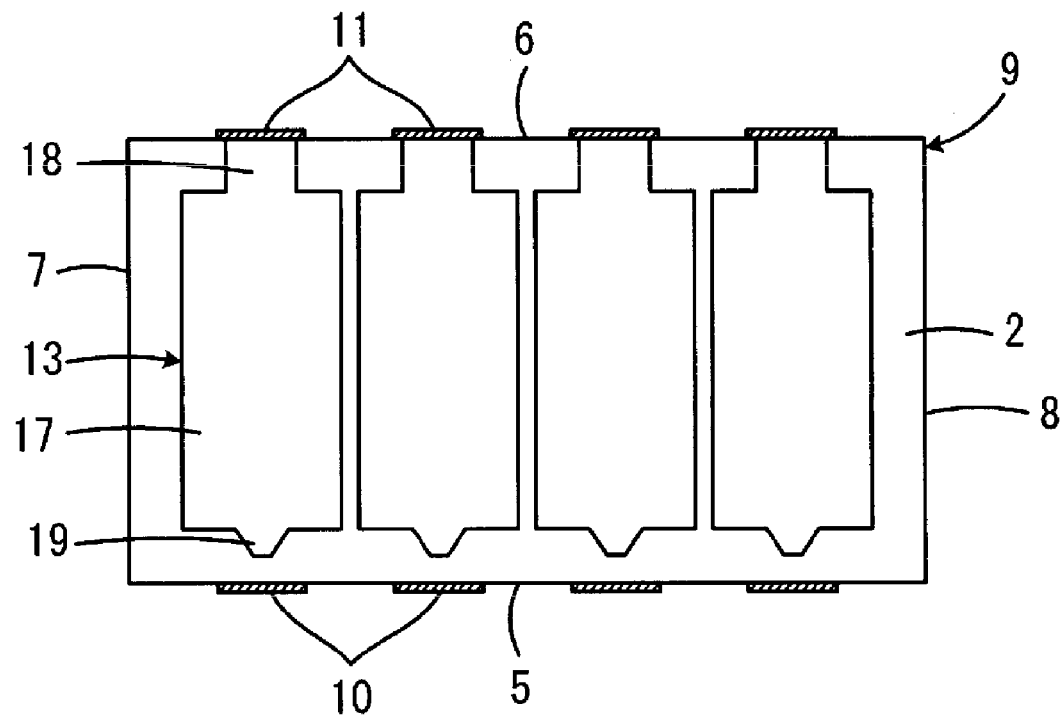

FIGS. 9A and 9B are diagrams corresponding to FIGS. 3A and 3B to explain a capacitor array 1*c* according to a fourth preferred embodiment of the present invention. In FIGS. 9A and 9B, the elements corresponding to the elements shown in FIGS. 3A and 3B are indicated by the same reference numerals as those set forth above and explanations thereof are not repeated hereafter.

In the capacitor array 1*c* shown in FIGS. 9A and 9B, the widths of the ends of the first and the second protrusion portions 16 and 19 are less than the widths of the first and the second lead portions 15 and 18, respectively, in a manner similar to that in the capacitor array 1*b* shown in FIGS. 8A and 8B. In addition, each of the first and the second protrusion portions 16 and 19 has a substantially tapered shape in which the width of the end is less than the width of the base.

With this configuration, substantially the same effects as those of the capacitor array 1*b* shown in FIGS. 8A and 8B are provided and, in addition, the concentration of electric fields on each of the ends of the protrusion portions 16 and 19 is improved and an attracting affect of a plating metal on the side surfaces 6 and 5 opposed to the protrusion portions 16 and 19, respectively, is improved.

The configuration described with reference to FIGS. 9A and 9B can be used in the capacitor array 1*a* shown in FIGS. 7A and 7B.

The Experimental examples provided to determine the effects of preferred embodiments of the present invention will be described below.

A capacitor array was prepared on the basis of the design included in the first preferred embodiment shown in FIGS. 3A and 3B as a sample related to an example within the scope of the present invention.

A ceramic slurry including a $BaTiO_3$ based ceramic powder was molded and dried so as to prepare ceramic green sheets. An electrically conductive paste including Ni was printed on the ceramic green sheets by screen printing so as to form electrically conductive paste films to define predetermined internal electrodes. At this time, internal electrodes having respective protrusion portions were prepared as the sample related to an example within the scope of the present invention. In addition, internal electrodes having no protrusion portion were also prepared as a sample related to a comparative example.

The ceramic green sheets were laminated and press-bonded so as to prepare a mother laminate. A green capacitor main body was cut from the mother laminate, and the green capacitor main body was fired at a maximum temperature of about 1,200° C. for about 2 hours.

The sintered ceramic laminate was subjected to an electrolytic barrel plating step under the following condition so as to form a Cu plating film to define an outer terminal electrode.

In the electrolytic barrel plating step, strike Cu plating and thick Cu plating were performed. The thickness of the resulting Cu plating film was about 8 μm including both of the strike Cu plating and the thick Cu plating. A horizontal rotating barrel was used in both of the strike Cu plating and thick Cu plating and the number of revolutions of the barrel was about 20 rpm. The details of each of the strike Cu plating and the thick Cu plating are as described below.

1. Strike Cu Plating
Plating Bath:

| | |
|---|---|
| copper pyrophosphate: | about 14 g/L |
| pyrophosphoric acid: | about 120 g/L |
| potassium oxalate: | about 10 g/L |
| pH: | about 8.5 |
| bath temperature: | about 25° C. |

Current density: about 0.1 A/dm$^2$
Time: about 60 minutes
2. Thick Cu Plating
Plating Bath:
PYROBRITE process bath produced by C. Uyemura & Co., Ltd.

| | |
|---|---|
| pH | about 8.8 |
| bath temperature | about 55° C. |

Current density: about 0.3 A/dm$^2$
Time: about 60 minutes

In this manner, a capacitor array related to each of the example and the comparative example was prepared. The size was about 2.0 mm×about 1.25 mm×about 0.85 mm, the thickness of the dielectric layer was about 1.6 μm, the thickness of the internal electrode was about 1.0 μm, and number of lamination of effective dielectric layers was 250.

With respect to 20 samples of each of the example and the comparative example, variations in the widths of the outer terminal electrodes were measured. The width of any outer terminal electrode of each sample was measured at five locations, and an average value was used as the width of the outer terminal electrode. Here, the five locations were an uppermost end point of the outer terminal electrode in the lamination direction, a lowermost end point, a midpoint, a point between the uppermost end point and the midpoint, and a point between the lowermost end point and the midpoint. A microgauge was used for the measurement.

Variations in the widths of the outer terminal electrodes were determined on the basis of a standard deviation, resulting in about 8 μm in the example and about 19 μm in the comparative example. As is clear from the results, the variation in the width of the outer terminal electrode of the example, in which the protrusion portion is provided, is significantly less than that of the comparative example in which no protrusion portion is provided.

While preferred embodiments of the invention have been described above, it is to be understood that variations and modifications will be apparent to those skilled in the art without departing the scope and spirit of the invention. The scope of the invention, therefore, is to be determined solely by the following claims.

What is claimed is:

1. A capacitor array comprising:
   a capacitor main body including a plurality of laminated dielectric layers having mutually opposed first and second principal surfaces, mutually opposed first and second side surfaces, and mutually opposed first and second end surfaces;
   a plurality of first outer terminal electrodes disposed on the first side surface and having substantial band shapes having widths less than a width of the first side surface;
   a plurality of second outer terminal electrodes disposed on the second side surface and having substantial band shapes having widths less than a width of the second side surface; and
   a plurality of first internal electrodes and a plurality of second internal electrodes disposed inside of the capacitor main body; wherein
   the plurality of first internal electrodes and the plurality of second internal electrodes are alternately arranged in a lamination direction and sets, each including the plurality of first internal electrodes and the plurality of second internal electrodes arranged alternately in the lamination direction, are arranged in width directions of the side surfaces;
   the first internal electrode includes a first capacitance portion opposed to the second internal electrode with a dielectric layer therebetween, a first lead portion which extends from the first capacitance portion toward the first side surface and which is electrically connected to the first outer terminal electrode, and a first protrusion portion partially protruding from the first capacitance portion toward the second outer terminal electrode on the second side surface while not extending to the second side surface;
   a width of the first lead portion is less than a width of the first capacitance portion and a width of an end of the first protrusion portion is less than the width of the first lead portion;
   the second internal electrode includes a second capacitance portion opposed to the first internal electrode with a dielectric layer therebetween, a second lead portion which extends from the second capacitance portion toward the second side surface and which is electrically connected to the second outer terminal electrode, and a second protrusion portion partially protruding from the second capacitance portion toward the first outer terminal electrode on the first side surface while not extending to the first side surface;
   a width of the second lead portion is less than a width of the second capacitance portion and a width of an end of the second protrusion portion is less than the width of the second lead portion;
   the first outer terminal electrode includes a first plating film directly connected to the first internal electrode; and
   the second outer terminal electrode includes a second plating film directly connected to the second internal electrode.

2. The capacitor array according to claim 1, wherein each of the first protrusion portion and the second protrusion portion has a substantially tapered shape in which the width of the end is less than a width of a base thereof.

3. The capacitor array according to claim 1, wherein the plurality of first internal electrodes are disposed in substantially the same plane, and the plurality of second internal electrodes are disposed in substantially the same plane that is different from the plane in which the first internal electrodes are disposed.

4. The capacitor array according to claim 1, wherein the first internal electrodes and the second internal electrodes are arranged alternately in the same plane.

5. A method for manufacturing a capacitor array comprising the steps of:
   preparing a capacitor main body including a plurality of laminated dielectric layers and having mutually opposed first and second principal surfaces, mutually opposed first and second side surfaces, and mutually opposed first and second end surfaces, and inside of which a plurality of first internal electrodes and a plurality of second internal electrodes are disposed, the plurality of first internal electrodes and the plurality of second internal electrodes are alternately arranged in a lamination direction, and sets, each including the plurality of first internal electrodes and the plurality of second internal electrodes alternately arranged in the lamination direction, are distributed in width directions of the side surfaces; and forming a plurality of first outer terminal electrodes having substantial band shapes having widths less than a width of the first side surface, on the first side surface and forming a plurality of second outer terminal electrodes having substantial band shapes having widths less than a width of the second side surface, on the second side surface; wherein the first internal electrode includes a first capacitance portion opposed to the second internal electrode with a dielectric layer therebetween, a first lead portion which extends from the first capacitance portion toward the first side surface and which is electrically connected to the first outer terminal electrode, and a first protrusion portion partially protruding from the first capacitance portion toward the second outer terminal electrode on the second side surface while not extending to the second side surface;

a width of the first lead portion is less than a width of the first capacitance portion and a width of an end of the first protrusion portion is less than the width of the first lead portion;

the second internal electrode includes a second capacitance portion opposed to the first internal electrode with a dielectric layer therebetween, a second lead portion which extends from the second capacitance portion toward the second side surface and which is electrically connected to the second outer terminal electrode, and a second protrusion portion partially protruding from the second capacitance portion toward the first outer terminal electrode on the first side surface while not extending to the first side surface;

a width of the second lead portion is less than a width of the second capacitance portion and a width of an end of the second protrusion portion is less than the width of the second lead portion;

the forming of the first and the second outer terminal electrodes includes electrolytic plating to directly form a plating film on portions of the first and second side surfaces at which end portions of the first and second lead portions are exposed; and in the electrolytic plating, deposition of plating is proceeds while being prevented from spreading in individual width directions of the second and first side surfaces by electric fields generated from the first and second protrusion portions toward the vicinities of exposure portions of the second lead portion and the first lead portion, respectively, on the second and the first side surface.

* * * * *